US012671955B2

(12) United States Patent
Fan et al.

(10) Patent No.: US 12,671,955 B2
(45) Date of Patent: Jun. 30, 2026

(54) PERSONALIZATION OF AUDIO CONTENT WITHIN A REAL-WORLD ENVIRONMENT

(71) Applicant: Sphere Entertainment Group, LLC, New York, NY (US)

(72) Inventors: Yuan-Yi Fan, New York, NY (US); Neil Wakefield, New York, NY (US)

(73) Assignee: Sphere Entertainment Group, LLC, New York, NY (US)

( * ) Notice: Subject to any disclaimer, the term of this patent is extended or adjusted under 35 U.S.C. 154(b) by 111 days.

(21) Appl. No.: 18/602,517

(22) Filed: Mar. 12, 2024

(65) Prior Publication Data

US 2025/0294306 A1 Sep. 18, 2025

(51) Int. Cl.
*H04S 7/00* (2006.01)
*H04R 27/00* (2006.01)

(52) U.S. Cl.
CPC .................................... *H04S 7/303* (2013.01)

(58) Field of Classification Search
CPC ................................ H04R 27/00; H04S 7/303
USPC ............................................ 381/303, 1, 300
See application file for complete search history.

(56) References Cited

U.S. PATENT DOCUMENTS

| | | | | |
|---|---|---|---|---|
| 10,687,145 | B1 | 6/2020 | Campbell | |
| 11,418,903 | B2 * | 8/2022 | Sim | A63F 13/424 |
| 12,288,007 | B2 * | 4/2025 | Pratt | G06F 3/165 |

FOREIGN PATENT DOCUMENTS

| | | | |
|---|---|---|---|
| CN | 105051299 | A | 11/2015 |
| CN | 214476119 | U | 10/2021 |
| WO | 2021061680 | A2 | 4/2021 |

OTHER PUBLICATIONS

International Search Report and Written Opinion directed to related International Application No. PCT/US2025/019113, mailed Jul. 1, 2025; 23 pages.

* cited by examiner

*Primary Examiner* — Thjuan K Addy
(74) *Attorney, Agent, or Firm* — Sterne, Kessler, Goldstein & Fox P.L.L.C.

(57) ABSTRACT

Systems, methods, and apparatuses can playback audiovisual content having audio and visual content. These systems, methods, and apparatuses can playback the visual content to various viewers within a real-world environment. These systems, methods, and apparatuses can cause playback of the audio content on various real-world user devices that are associated with these viewers. These systems, methods, and apparatuses can personalize the audio content being played back by these real-world user devices to various spatial positions of these real-world user devices within the real-world environment.

24 Claims, 7 Drawing Sheets

PERSONALIZATION OF AUDIO CONTENT WITHIN A REAL-WORLD ENVIRONMENT

BACKGROUND

Spatial audio, also known as three-dimensional audio, can include three-dimensional sounds that allow viewers to perceive this audio content as being provided from multiple directions and/or multiple distances. Home audio systems conventionally implement spatial audio through advanced speaker systems or soundbars that use techniques such as Dolby Atmos or DTS:X to provide some examples. These home audio systems create a more immersive listening experience by placing sounds in specific locations, making it feel as if the audio is coming from various points around the room. Larger arena systems within a venue, such as a music venue, for example, a music theater, a music club, and/or a concert hall, a sporting venue, for example, an arena, a convention center, and/or a stadium, are often employed to enhance an event such include a musical event, a theatrical event, a sporting event, or a motion picture, among others. This involves strategically placing speakers around the venue to create an immersive sound experience for the audience. However, implementing spatial audio outdoors can be challenging due to the open environment. The Just Noticeable Difference (JND) of Interaural Time Difference (ITD) refers to the smallest change, for example, approximately 10 microseconds, in the time delay between sounds arriving that a human can perceive. Similarly, the JND for Interaural Level Difference (ILD) is approximately 1 decibel (dB) in the approximate range of 2 kilohertz (kHz) to 5 kHz. In some situations, long delays often distort the perception of the direction of the sound source, potentially leading to an artificial or disorienting effect.

BRIEF DESCRIPTION OF THE DRAWINGS

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

Figure 1:
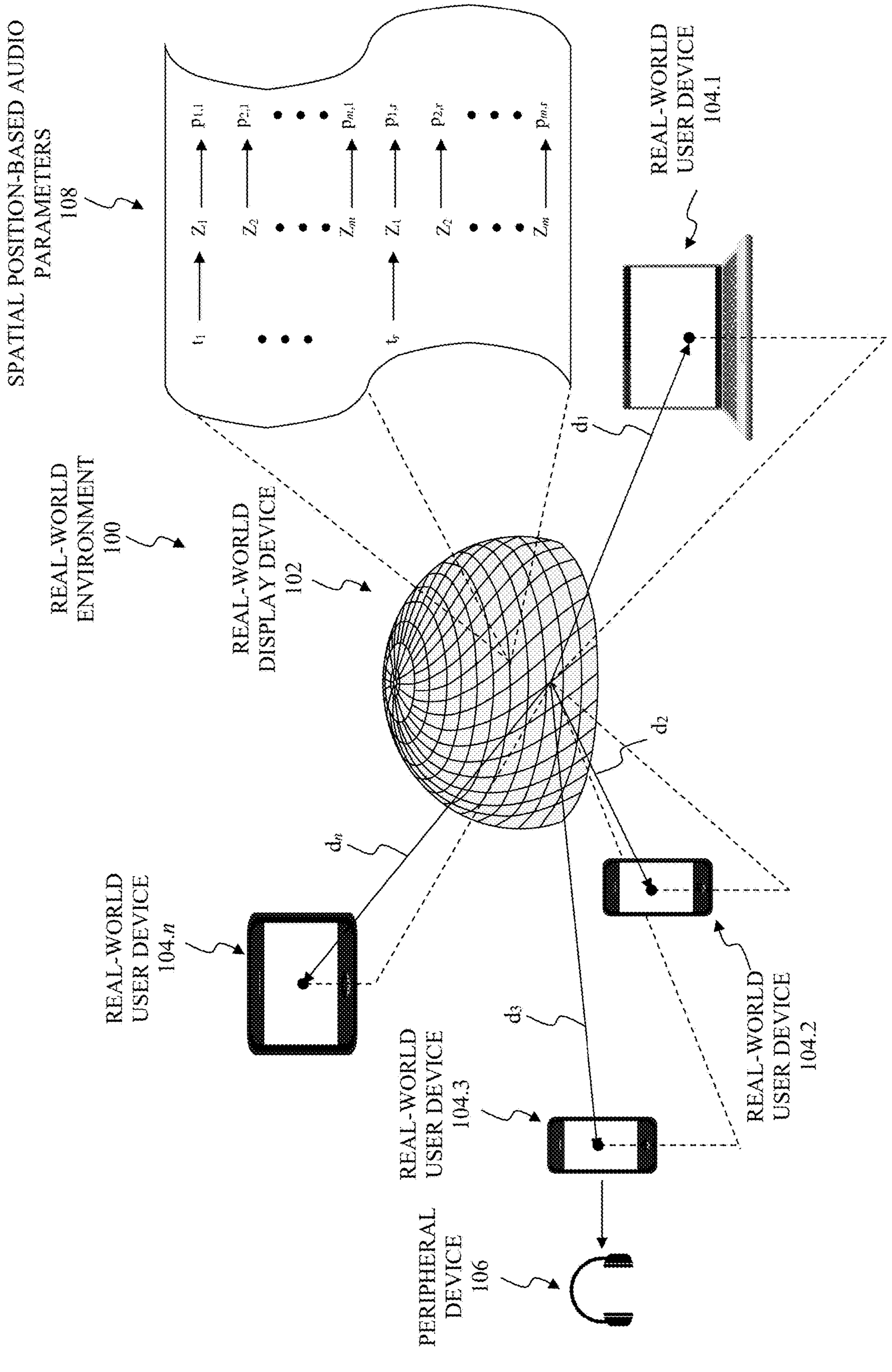
FIG. 1 illustrates a simplified block diagram of an exemplary real-world environment according to some exemplary embodiments of the present disclosure.

The present disclosure will now be described with reference to the accompanying drawings.

DETAILED DESCRIPTION

The following disclosure provides many different embodiments, or examples, for implementing different features of the provided subject matter. Specific examples of components and arrangements are described herein to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

The following disclosure may include spatially relative terms, such as “beneath,” “below,” “lower,” “above,” “on,” “upper,” and the like, herein for case of description to describe relationship between elements or features as illustrated in the figure(s). These spatially relative terms are intended to encompass different orientations for the different embodiments, or examples, depicted in the figure(s). The different embodiments, or examples, may be otherwise oriented (rotated 90 degrees or at other orientations) and the spatially relative terms included herein may likewise be interpreted accordingly. Moreover, the following disclosure may include the terms “about” or “substantially” to indicate the value of a given quantity can vary based on a particular technology. Based on the technology, the term “about” or “substantially” can indicate a value of a given quantity that varies within, for example, 1-15% of the value (e.g., ±1%, ±2%, ±5%, ±10%, or ±15% of the value).

Overview

Systems, methods, and apparatuses can playback audiovisual content having audio and visual content. These systems, methods, and apparatuses can playback the visual content to various viewers within a real-world environment. These systems, methods, and apparatuses can cause playback of the audio content on various real-world user devices that are associated with these viewers. These systems, methods, and apparatuses can personalize the audio content being played back by these real-world user devices to various spatial positions of these real-world user devices within the real-world environment.

Exemplary Real-World Environment

FIG. 1 illustrates a simplified block diagram of an exemplary real-world environment according to some exemplary embodiments of the present disclosure. In the exemplary embodiment illustrated in FIG. 1, a real-world environment 100 can playback audiovisual content having audio and visual content. Although the discussion herein can describe the real-world environment 100 as performing certain actions, operations, routines, procedures, or the like, it should be appreciated that such descriptions are merely for convenience and that such actions, operations, routines, procedures, or the like result from operation of one or more electrical, mechanical, and/or electro-mechanical devices within the real-world environment 100 that will be apparent to those skilled in the relevant art(s) without departing from the spirit and scope of the present disclosure. As to be described herein, the real-world environment 100 can playback the visual content to various viewers within the real-world environment 100. And as to be described herein, the real-world environment 100 can playback the audio content on various real-world user devices that are associated with these viewers. In some embodiments, the audio content can include spatial audio content. The spatial audio content, also known as three-dimensional audio content, can include three-dimensional sounds that allow viewers within the real-world environment 100 to perceive this audio content as being provided from multiple directions and/or multiple distances. In some embodiments, the real-world environment 100 can personalize the audio content being played back by these real-world user devices to various spatial positions of these real-world user devices within the real-world environment 100. In these embodiments, the audio content being played back by these real-world user devices at these various spatial positions can be characterized as being synchronized to the one or more types of visual content $t_1$ through $t_r$ to being played back within the real-world environment 100. As illustrated in FIG. 1, the real-world environment 100 can include a real-world display device 102, real-world user devices 104.1 through 104.*n*, and/or one or more peripheral devices 106 that can be associated with the real-world user devices 104.1 through 104.*n*.

In the exemplary embodiment illustrated in FIG. 1, the real-world display device 102 represents a three-dimensional media display device that can playback the visual content throughout the real-world environment 100. In some embodiments, the real-world display device 102 can include one or more visual displays, often referred to as a three-dimensional media plane, which are spread across the exterior of the real-world display device 102. In these embodiments, the one or more visual displays can include a series of rows and a series of columns of picture elements, also referred to as pixels, in three-dimensions that form the real-world display device 102. In these embodiments, the pixels can be implemented using one or more light-emitting diode (LED) displays, one or more organic light-emitting diode (OLED) displays, and/or one or more quantum dots (QDs) displays to provide some examples. For example, the three-dimensional media plane 102 can include the one or more visual displays that wrap around the exterior of the real-world display device 102 to form an approximate 580,000 square foot visual display. In the exemplary embodiment illustrated in FIG. 1, the real-world display device 102 can playback the visual content on the one or more visual displays to various viewers within the real-world environment 100 that are associated with the real-world user devices 104.1 through 104.*n*. As illustrated in FIG. 1, the real-world display device 102 can be implemented as a three-dimensional structure, for example, a hemisphere structure, also referred to as a hemispherical dome, or a hemisphere like structure. However, this example is not limiting. Rather, those skilled in the relevant art(s) will recognize that the real-world display device 102 can represent any other suitable three-dimensional structure, such as a cube, a sphere, a cone, a pyramid, a rectangular prism, or a cylinder, among others, to provide some examples, without departing from the spirit and scope of the present disclosure. And those skilled in the relevant art(s) will recognize that the real-world display device 102 can even represent any suitable two-dimensional structure, such as a circle, a triangle, a square, a rectangle, a pentagon, a quadrilateral, a hexagon, or an octagon, among others, to provide some examples, without departing from the spirit and scope of the present disclosure. In some embodiments, this suitable two-dimensional structure can be connected to one or more building and/or non-building structures as will be recognized by those skilled in the relevant art(s) without departing from the spirit and scope of the present disclosure.

The real-world display device 102 can personalize the audio content to the various spatial positions of the real-world user devices 104.1 through 104.*n* within the real-world environment 100. In some embodiments, the real-world display device 102 can include, or be coupled to, one or more electrical, mechanical, and/or electro-mechanical devices, an example of which is to be described herein, to personalize this audio content as to be described herein. As part of this personalization, the real-world display device 102 can identify spatial positions $d_1$ through $d_n$ of the real-world user devices 104.1 through 104.*n* within the real-world environment 100. In some embodiments, the spatial positions $d_1$ through $d_n$ can include the three-dimensional coordinates, for example, x, y, and z coordinates of a Cartesian coordinate system and/or r, θ, and φ coordinates of a spherical coordinate system, among others, of the real-world user devices 104.1 through 104.*n* within the real-world environment 100. In these embodiments, the spatial positions $d_1$ through $d_n$ can represent absolute locations of the real-world user devices 104.1 through 104.*n* within the real-world environment 100, expressed in terms of two-dimensions or three-dimensions. Alternatively, the spatial positions $d_1$ through $d_n$ can represent relative locations of the real-world user devices 104.1 through 104.*n* within the real-world environment 100, expressed in terms of two-dimensions or three-dimensions, in relation to the real-world display device 102. Although the real-world user devices 104.1 through 104.*n* are illustrated in FIG. 1 as having different spatial positions from among the spatial positions $d_1$ through $d_n$, those skilled in the relevant art(s) will recognize that one or more of the real-world user devices 104.1 through 104.*n* can have similar spatial positions from among the spatial positions $d_1$ through $d_n$ without departing from the spirit and scope of the present disclosure. Alternatively, or in addition to, the three-dimensional coordinates, the spatial positions $d_1$ through $d_n$ can include the three-dimensional orientations, often expressed in terms of yaw, pitch, and roll, of the real-world user devices 104.1 through 104.*n* within the real-world environment 100. In some embodiments, the real-world display device 102 can access the spatial positions $d_1$ through $d_n$ of the real-world user devices 104.1 through 104.*n*. In these embodiments, the real-world display device 102 can retrieve the spatial positions $d_1$ through $d_n$ from the real-world user devices 104.1 through 104.*n*. In these embodiments, the real-world display device 102 can dynamically retrieve the spatial positions $d_1$ through $d_n$ from the real-world user devices 104.1 through 104.*n*, for example, once every millisecond, once every ten milliseconds, once every one-hundred milliseconds, once every second, once every ten seconds, and/or once every one-hundred seconds, among others. This dynamic retrieval can be beneficial to personalize the audio content to the real-world user devices 104.1 through 104.*n* when these real-world user devices are moving within the real-world environment 100.

After determining the spatial positions $d_1$ through $d_n$, the real-world display device 102 can personalize the audio content being played back by the real-world user devices 104.1 through 104.*n* to the spatial positions $d_1$ through $d_n$. As to be described herein, the real-world display device 102 can identify one or more parameters, characteristics, and/or attributes, collectively referred to as audio parameters $p_1$ through $p_m$, for the audio content that are associated with the spatial positions $d_1$ through $d_n$. In some embodiments, the audio parameters $p_1$ through $p_m$ can include, or be in terms of, sound intensity and/or time delay, among others for the audio content at the spatial positions $d_1$ through $d_n$. In some embodiments, the audio parameters $p_1$ through $p_m$ can be further based upon one or more types of visual content $t_1$ through $t_r$ being played back by the real-world display device 102 on the real-world display device 102, denoted as audio parameters $p_{1,1}$ through $p_{m,r}$ in FIG. 1. In these embodiments, the audio parameters $p_{1,1}$ through $p_{m,r}$ can include, or be in terms of, sound intensity and/or time delay, among others for the one or more types of visual content $t_1$ through $t_r$ at the spatial positions $d_1$ through $d_n$. In these embodiments, the one or more types of visual content $t_1$ through $t_r$ can include two-dimensional anamorphic visual content, three-dimensional volumetric visual content, pass-through visual content, and/or augmented reality visual content, among others, each of which is to be described herein.

In some embodiments, the real-world display device 102 can access the audio parameters $p_{1,1}$ through $p_{m,r}$ for the one or more types of visual content $t_1$ through $t_r$ at the spatial positions $d_1$ through $d_n$ from spatial position-based audio parameters 108. In these embodiments, the spatial position-based audio parameters 108 can represent an organized collection of data, often referred to as a database, having the audio parameters $p_{1,1}$ through $p_{m,r}$ that is indexable by the one or more types of visual content $t_1$ through $t_r$ and/or spatial zones $Z_1$ through $Z_m$. For example, each type of visual content from among the one or more types of visual content $t_1$ through $t_r$ is associated with one or more spatial zones $Z_1$ through $Z_m$ and one or more corresponding sets of audio parameters from among the audio parameters $p_{1,1}$ through $P_{m,r}$ as illustrated in the spatial position-based audio parameters 108 in FIG. 1. In some embodiments, the database may include one or more data tables having data values, such as alphanumeric strings, integers, decimals, floating points, dates, times, binary values, Boolean values, and/or enumerations to provide some examples. In some embodiments, the real-world display device 102 can identify the one or more types of visual content $t_1$ through $t_r$ that corresponds to the visual content being played back by the real-world display device 102. In these embodiments, the real-world display device 102 can identify the spatial zones $Z_1$ through $Z_m$ from the spatial position-based audio parameters 108 that includes the spatial positions $d_1$ through $d_n$. In these embodiments, the real-world display device 102 can access the audio parameters $p_{1,1}$ through $p_{m,r}$ from the spatial position-based audio parameters 108 that are associated with the one or more types of visual content $t_1$ through $t_r$ within the spatial zones $Z_1$ through $Z_m$ from the spatial position-based audio parameters 108.

After accessing the audio parameters $p_{1,1}$ through $p_{m,r}$, the real-world display device 102 can personalize the audio content being played back by the real-world user devices 104.1 through 104.*n* to the spatial positions $d_1$ through $d_n$. As to be described herein, this personalization can be performed server-side, namely, by the real-world display device 102, In some embodiments, the real-world display device 102 can process the audio content, for example, amplitudes and/or frequencies, among others, of the audio content, to produce the audio content having the audio parameters $p_{1,1}$ through $p_{m,r}$ at the spatial positions $d_1$ through $d_n$. For example, the audio parameters $p_{1,1}$ through $p_{m,r}$ can include various sound intensities and/or time delays, among others, of the audio content being played back by the real-world user devices 104.1 through 104.*n* for the one or more types of visual content $t_1$ through $t_r$ at the spatial positions $d_1$ through $d_n$. In this example, the real-world display device 102 can process the audio content, for example, amplitudes and/or frequencies, among others, of the audio content, to produce the audio content having the sound intensities and/or the time delays, among others, for the one or more types of visual content $t_1$ through $t_r$ at the spatial positions $d_1$ through $d_n$. As to be described herein, the real-world user devices 104.1 through 104.*n* can playback the processed audio content to personalize the audio content for the one or more types of visual content $t_1$ through $t_r$ to the spatial positions $d_1$ through $d_n$. In these embodiments, the real-world display device 102 can packetize the processed audio content to provide digital audio content packets to the real-world user devices 104.1 through 104.*n*. Alternatively, or in addition to, the real-world display device 102 can provide the audio parameters $p_{1,1}$ through $p_{m,r}$ to the real-world user devices 104.1 through 104.*n* within the digital audio content packets. As to be described herein, the real-world user devices 104.1 through 104.*n* can process the audio content, for example, amplitudes and/or frequencies, among others, of the audio content, in accordance with the audio parameters $p_{1,1}$ through $p_{m,r}$ in a substantially similar manner as the real-world display device 102 as described herein to personalize the audio content for the one or more types of visual content $t_1$ through $t_r$ at the spatial positions $d_1$ through $d_n$.

In the exemplary embodiment illustrated in FIG. 1, the real-world user devices 104.1 through 104.*n* can playback the audio content at the spatial positions within the real-world environment 100. In some embodiments, the real-world user devices 104.1 through 104.*n* can include a consumer electronics device, a cellular phone, a smartphone, a feature phones, a tablet computer, a wearable computer device, a personal digital assistant (PDA), pager, a wireless handset, a desktop computer, a laptop computer, an in-vehicle infotainment (IVI), an in-car entertainment (ICE) device, an Instrument Cluster (IC), a head-up display (HUD) device, an onboard diagnostic (OBD) device, a dashtop mobile equipment (DME), a mobile data terminal (MDT), an Electronic Engine Management System (EEMS), an electronic/engine control units (ECU), an electronic/engine control module (ECM), an embedded system, a microcontroller, a control module, an engine management system (EMS), a networked or "smart" appliance, a Machine-Type-Communication (MTC) device, a Machine-to-Machine (M2M) device, an Internet of Things (IoT) device, and the like. In some embodiments, the real-world user devices 104.1 through 104.*n* can include hundreds, thousands, tens of thousands, and even more real-world user devices within the real-world environment 100.

In some embodiments, the real-world user devices 104.1 through 104.*n* can playback the audio content at the spatial positions $d_1$ through $d_n$ to personalize the audio content being played back by the real-world user devices 104.1 through 104.*n* for the one or more types of visual content $t_1$ through $t_r$ to the spatial positions $d_1$ through $d_n$. In these embodiments, the audio content being played back by the real-world user devices 104.1 through 104.*n* at the spatial positions $d_1$ through $d_n$ can be characterized as being synchronized to the one or more types of visual content $t_1$ through $t_r$ being played back by the real-world display device 102. As part of this playing back, the real-world user devices 104.1 through 104.*n* can provide the spatial positions $d_1$ through $d_n$ to the real-world display device 102. In some embodiments, the real-world user devices 104.1 through 104.*n* can provide the spatial positions $d_1$ through $d_n$, for example, once every millisecond, once every ten milliseconds, once every one-hundred milliseconds, once every second, once every ten seconds, and/or once every one-hundred seconds, among others. After providing the spatial positions $d_1$ through $d_n$, the real-world user devices 104.1 through 104.*n* can playback the audio content for the one or more types of visual content $t_1$ through $t_r$ at the spatial positions $d_1$ through $d_n$. In some embodiments, the real-world user devices 104.1 through 104.*n* can recover the audio content for the one or more types of visual content $t_1$ through $t_r$ at the spatial positions $d_1$ through $d_n$ from the digital audio content packets provided by the real-world display device 102. In these embodiments, the real-world user devices 104.1 through 104.*n* can playback the recovered audio content to personalize the audio content for the one or more types of visual content $t_1$ through $t_r$ to the spatial positions $d_1$ through $d_n$. Alternatively, or in addition to, the real-world user devices 104.1 through 104.*n* can access the audio parameters $p_{1,1}$ through $p_{m,r}$ for the audio content from the digital audio content packets. In some embodiments, the real-world user devices 104.1 through 104.*n* can access the audio content from the real-world display device 102. In these embodiments, the real-world user devices 104.1 through 104.*n* can process the audio content in a substantially similar manner as the real-world display device 102 as described herein to produce the audio content having the sound intensities and/or the time delays, among others, for the one or more types of visual content $t_1$ through $t_r$ at the spatial positions $d_1$ through $d_n$. In these embodiments, the real-world user devices 104.1 through 104.*n* can playback the processed audio content to personalize the audio content for the one or more types of visual content $t_1$ through $t_r$ to the spatial positions $d_1$ through $d_n$.

In some embodiments, one or more of the real-world user devices 104.1 through 104.*n*, such as the real-world user device 104.3 as illustrated in FIG. 1 to provide an example, can be associated with one or more peripheral devices 106. In these embodiments, the one or more peripheral devices 106 can include displays, printers, speakers, headphones, games controllers, virtual reality (VR) headsets, VR controllers, and/or any other suitable electrical, mechanical, and/or electromechanical device that is capable of playing back audio, or sound, that will be apparent to those skilled in the relevant art(s) without departing from the spirit and scope of the present disclosure. In some embodiments, the real-world user devices 104.1 through 104.*n* can alternatively, or additionally, provide the processed audio content, as described herein, to the one or more peripheral devices 106 for playback.

Figure 2:
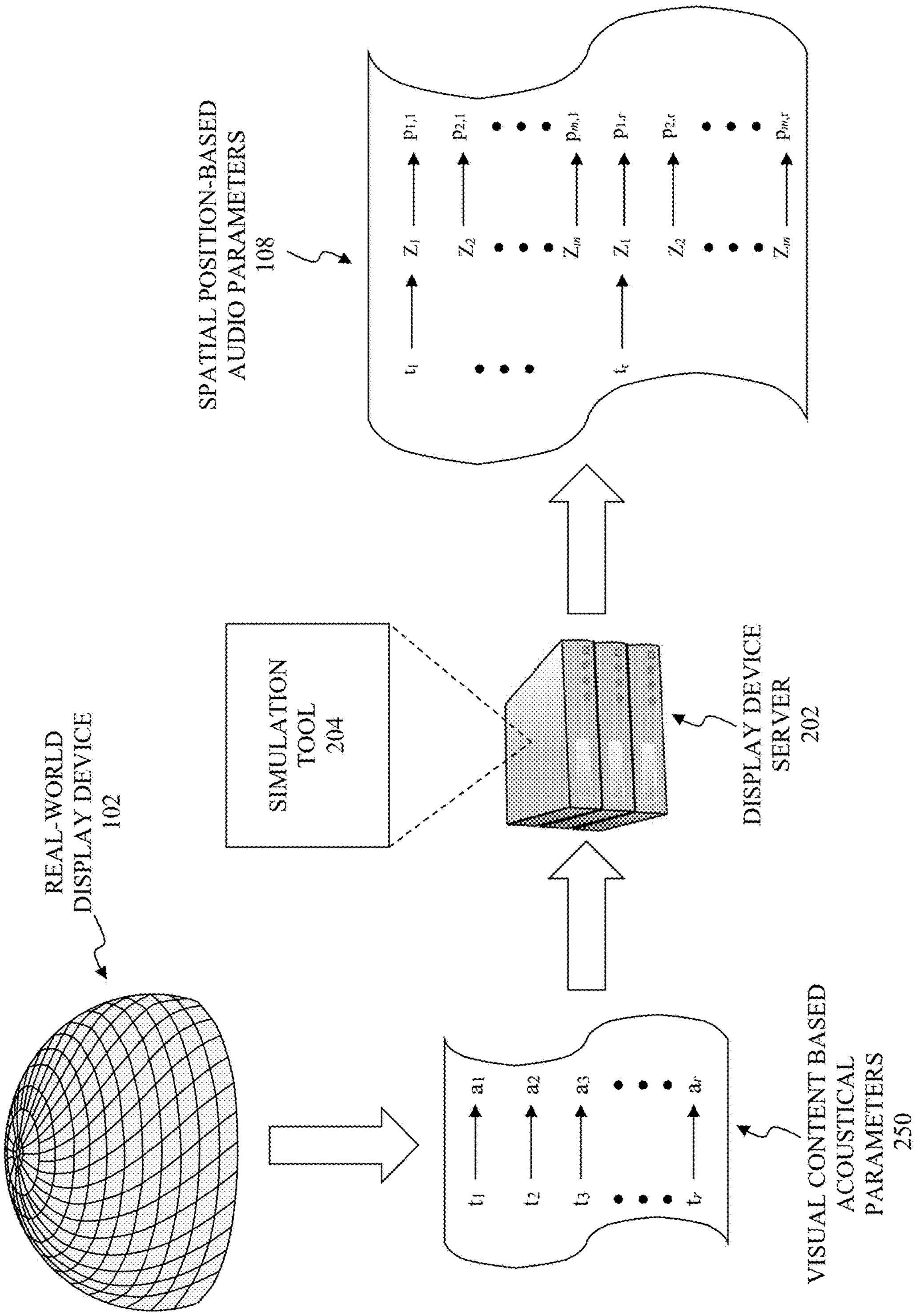
FIG. 2 illustrates a simplified block diagram of a display device server that can be implemented within the exemplary real-world environment according to some exemplary embodiments of the present disclosure.

Exemplary Spatial Position-Based Audio Parameters that can be Determined by the Exemplary Real-World Environment FIG. 2 illustrates a simplified block diagram of a display device server that can be implemented within the exemplary real-world environment according to some exemplary embodiments of the present disclosure. As described herein, the real-world display device 102 can access the audio parameters $p_{1,1}$ through $p_{m,r}$ that are associated with the one or more types of visual content $t_1$ through $t_r$ within the spatial zones $Z_1$ through $Z_m$ from the spatial position-based audio parameters 108. The discussion of FIG. 2 to follow is to describe exemplary operation of a display device server 202 to determine the spatial position-based audio parameters 108. In some embodiments, the display device server 202 can be implemented as a standalone electrical, mechanical, and/or electromechanical device, or a discrete device, and/or can be incorporated within or coupled to another electrical, mechanical, and/or electromechanical device, or a host device, such the real-world display device 102 as described herein. As to be described herein, the display device server 202 can model the real-world environment 100 in a virtual environment. In some embodiments, the display device server 202 can simulate the play back of the audio content within the model of the real-world environment 100 in the virtual environment to determine the audio parameters $p_{1,1}$ through $p_{m,r}$ for the one or more types of visual content $t_1$ through $t_r$ within spatial zones $Z_1$ through $Z_m$ to be included within the spatial position-based audio parameters 108 as described herein. In these embodiments, the display device server 202 can store the audio parameters $p_{1,1}$ through $p_{m,r}$ for the one or more types of visual content $t_1$ through $t_r$ within the spatial zones $Z_1$ through $Z_m$, respectively, in the spatial position-based audio parameters 108 as described herein.

In the exemplary embodiment illustrated in FIG. 2, the display device server 202 can access visual content based acoustical parameters 250 that identify one or more parameters, characteristics, and/or attributes of the real-world environment 100, collectively referred to as sets of real-world acoustical properties $a_1$ through $a_r$ in FIG. 2, that are associated with the one or more types of visual content $t_1$ through $t_r$. In some embodiments, each type of visual content from among the one or more types of visual content $t_1$ through $t_r$ is associated with a set of real-world environment characteristics from among the sets of real-world acoustical properties $a_1$ through $a_r$ as illustrated in the visual content based acoustical parameters 250 in FIG. 2. In some embodiments, the one or more types of visual content $t_1$ through $t_r$ represent one or more types of visual content that are capable of being played back by the real-world display device 102. In these embodiments, the one or more types of visual content $t_1$ through $t_r$ can include two-dimensional anamorphic visual content, three-dimensional volumetric visual content, pass-through visual content, and/or augmented reality visual content, among others, each of which is to be described herein.

Generally, the sets of real-world acoustical properties $a_1$ through $a_r$ can guide the display device server 202 to determine the audio parameters $p_1$ through $p_m$ within the spatial zones $Z_1$ through $Z_m$ for the one or more types of visual content $t_1$ through $t_r$ as described herein. In some embodiments, the display device server 202 can use the sets of real-world acoustical properties $a_1$ through $a_r$ to model the acoustical properties of the real-world environment 100 within the spatial zones $Z_1$ through $Z_m$ in the virtual environment for the one or more types of visual content $t_1$ through $t_r$. In these embodiments, the sets of real-world acoustical properties $a_1$ through $a_r$ can be related to the physical construction of the real-world display device 102 that can affect occlusion, reflection, and diffraction of the audio content propagating through the real-world environment 100. In these embodiments, the physical construction of the real-world display device 102 can include the physical shape of the real-world display device 102 or the physical three-dimensional surface of real-world display device 102, for example, in terms of geometry of the physical three-dimensional surface and/or physical materials of the physical three-dimensional surface, among others. For example, the sets of real-world acoustical properties $a_1$ through $a_r$ can include, or be related to, a coordinate system to model the real-world environment 100, spatialization of the audio content within the real-world environment 100, movement of objects within the real-world environment 100, transparency of objects within the real-world environment 100, and/or acoustics modeling for the real-world environment 100 in terms of occlusion, reflection, and/or diffraction, among others.

After accessing the visual content based acoustical parameters 250, the display device server 202 can model the real-world environment 100 in the virtual environment, for example, in accordance with the visual content based acoustical parameters 250. In some embodiments, the display device server 202 can execute a simulation tool 204 to model the real-world environment 100 in the virtual environment. In these embodiments, the simulation tool 204 can be implemented as game engine, or other simulation software, that will be apparent to those skilled in the relevant art(s) to model the real-world environment 100 in the virtual environment without departing from the sprit and scope of the present disclosure. Generally, the display device server 202 can model the acoustical properties, for example, occlusion, reflection, and/or diffraction, among others of the real-world environment 100 in a virtual space, also referred to as a virtual room, in the virtual environment.

As part of this modeling, the display device server 202 can define the three-dimensional geometry of the virtual space in terms of, for example, one or more building structures, such as the real-world display device 102, and/or one or more non-building structures, within the real-world environment 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In some embodiments, the three-dimensional geometry of the virtual space can be used to assist in modeling acoustical properties, for example, occlusion, reflection, and/or diffraction, among others of the real-world environment 100 in the virtual space. In these embodiments, the three-dimensional geometry of the virtual space can be used to model interactions of the audio content with the one or more building structures and/or the one or more non-building structures within the real-world environment 100.

As part of this modeling, the display device server 202 can assign the acoustical properties to the three-dimensional surfaces of the one or more building structures and/or the one or more non-building structures to model interactions of the audio content with these building structures and/or these non-building structures within the real-world environment 100. In some embodiments, the display device server 202 can assign acoustical properties to the real-world display device 102. In these embodiments, the display device server 202 can assign acoustical properties to the physical shape of the real-world display device 102 or the physical three-dimensional surface of real-world display device 102, for example, in terms of geometry of the physical three-dimensional surface and/or physical materials of the physical three-dimensional surface, among others in the virtual space.

In some embodiments, the display device server 202 can assign the acoustical properties to the real-world display device 102 in accordance with the visual content based acoustical parameters 250. In these embodiments, the acoustical properties can assign the sets of real-world acoustical properties $a_1$ through $a_r$ for the one or more types of visual content $t_1$ through $t_r$ to the real-world display device 102 as described herein.

After modeling the real-world environment 100 in the virtual environment, the display device server 202 can simulate the real-world display device 102 playing back the audio content within the model of the real-world environment 100 in the virtual environment to determine the audio parameters $p_{1,1}$ through $p_{m,r}$ for the one or more types of visual content $t_1$ through $t_r$ within the spatial zones $Z_1$ through $Z_m$. In some embodiments, the display device server 202 can use the model of the real-world environment 100 in the virtual environment to simulate the interaction of the audio content being played back by the real-world display device 102 with the model of the real-world environment 100 in the virtual environment. In some embodiments, the display device server 202 can iteratively simulate audio content being played back by the real-world display device 102 within the model of the real-world environment 100 for different types of visual content from among the one or more types of visual content $t_1$ through $t_r$, to determine the audio parameters $p_{1,1}$ through $p_{m,r}$ within the spatial zones $Z_1$ through $Z_m$ for the one or more types of visual content $t_1$ through $t_r$ as described herein. In these embodiments, the display device server 202 can iteratively simulate the interaction of the audio content for the one or more types of visual content $t_1$ through $t_r$ with the model of the real-world environment 100 in terms of occlusion, reflection, and/or diffraction, among others to determine the audio parameters $p_{1,1}$ through $p_{m,r}$ for the one or more types of visual content $t_1$ through $t_r$ within the spatial zones $Z_1$ through $Z_m$. For example, the display device server 202 can iteratively simulate the interaction of the audio content for the one or more types of visual content $t_1$ through $t_r$ with the one or more building structures, such as the real-world display device 102, and/or the one or more non-building structures, of the model of the real-world environment 100 in terms of occlusion, reflection, and/or diffraction, among others. In these embodiments, the display device server 202 can store the audio parameters $p_{1,1}$ through $p_{m,r}$ within the spatial zones $Z_1$ through $Z_m$ for the one or more types of visual content $t_1$ through $t_r$ in the spatial position-based audio parameters 108 as described herein.

Exemplary Operation of Modeling of the Exemplary Real-World Environment

Figure 3:
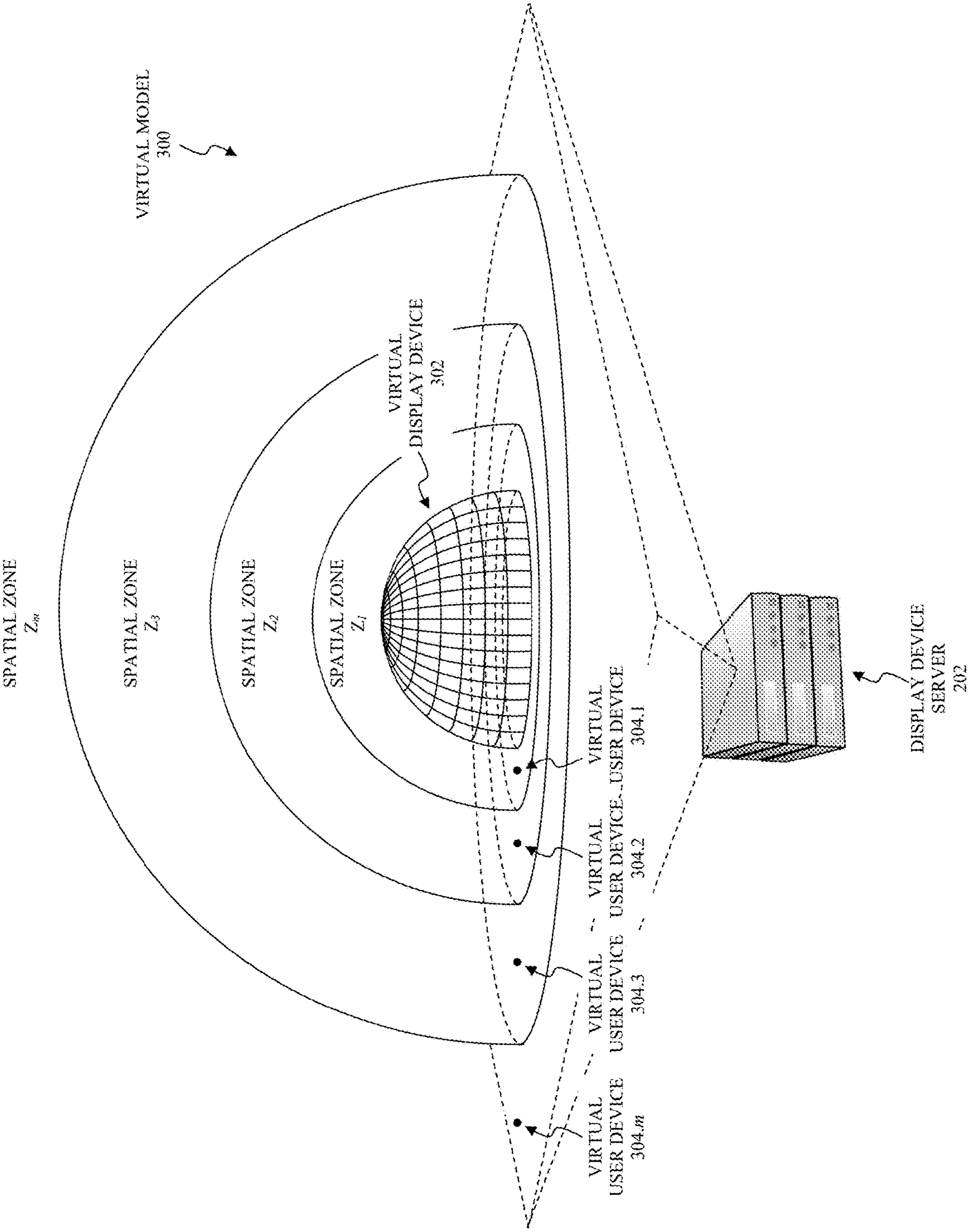
FIG. 3 graphically illustrates an exemplary operation of modeling of the exemplary real-world environment according to some exemplary embodiments of the present disclosure.

FIG. 3 graphically illustrates an exemplary operation of modeling of the exemplary real-world environment according to some exemplary embodiments of the present disclosure. In the exemplary embodiment illustrated in FIG. 3, the display device server 202 can develop a virtual model 300 of the real-world environment 100 in the virtual environment and can thereafter simulate the audio content being played back within the virtual model 300 in the virtual environment to determine the audio parameters $p_{1,1}$ through $p_{m,r}$ for the one or more types of visual content $t_1$ through $t_r$ for the spatial zones $Z_1$ through $Z_m$. The discussion of FIG. 2 to follow is to describe exemplary actions, operations, routines, procedures, or the like that can be executed by the display device server 202 to determine the audio parameters $p_{1,1}$ through $p_{m,r}$ for the one or more types of visual content $t_1$ through $t_r$ for the spatial zones $Z_1$ through $Z_m$. As illustrated in FIG. 3, the spatial zones $Z_1$ through $Z_m$ represent concentric three-dimensional volumes, for example, spherical shells, surrounding the virtual display device 302 in the virtual environment. However, this example is not limiting, those skilled in the relevant art(s) will recognize that the spatial zones $Z_1$ through $Z_m$ can be implemented using other three-dimensional volumes, such as cubes, spheres, cones, pyramids, rectangular prisms, or cylinders, among others, to provide some examples, without departing from the spirit and scope of the present disclosure.

As illustrated in FIG. 3, the display device server 202 can model the virtual model 300 of the real-world environment 100 in the virtual environment as described herein. In some embodiments, the virtual model 300 can include the virtual display device 302 that can be characterized as being a computer-generated representation of the real-world display device 102 in the virtual environment. In these embodiments, the display device server 202 can model the physical shape of the real-world display device 102 or the physical three-dimensional surface of real-world display device 102, for example, in terms of geometry of the physical three-dimensional surface and/or physical materials of the physical three-dimensional surface, among others in in the virtual environment to develop the model of the virtual display device 302. In these embodiments, the display device server 202 can assign acoustical properties, for example, occlusion, reflection, and/or diffraction, among others to the virtual display device 302 in the virtual environment in a substantially similar manner as described herein to model interactions of the audio content with the virtual display device 302 in the virtual environment.

In the exemplary embodiment illustrated in FIG. 3, the display device server 202 can simulate the virtual display device 302 playing back the audio content to virtual user devices 304.1 through 304.*m* in the virtual environment to determine the audio parameters $p_{1,1}$ through $p_{m,r}$ for the spatial zones $Z_1$ through $Z_m$ for the one or more types of visual content $t_1$ through $t_r$. Although the exemplary embodiment illustrated in FIG. 3 illustrates the virtual model 300 including the virtual user devices 304.1 through 304.*m*, this is for exemplary purposes only. Rather, those skilled in the relevant arts will recognize that the virtual model 300 can include one or more virtual user devices that are virtually moved among for the spatial zones $Z_1$ through $Z_m$ to emulate the virtual user devices 304.1 through 304.*m* without departing from the spirit and scope of the present disclosure.

In some embodiments, the display device server 202 can iteratively simulate audio content being played back by the virtual display device 302 to the virtual user devices 304.1 through 304.*m* for the one or more types of visual content $t_1$ through $t_r$ to determine the audio parameters $p_{1,1}$ through $p_{m,r}$ for the spatial zones $Z_1$ through $Z_m$ for the one or more types of visual content $t_1$ through $t_r$. In these embodiments, the display device server 202 can iteratively simulate the interaction of the audio content for the one or more types of visual content $t_1$ through $t_r$ with the virtual model 300 in terms of occlusion, reflection, and/or diffraction, among others to determine the audio parameters $p_{1,1}$ through $p_{m,r}$ for the spatial zones $Z_1$ through $Z_m$. In some embodiments, the display device server 202 can identify one or more parameters, characteristics, and/or attributes, collectively referred to as the audio parameters $p_{1,1}$ through $p_{m,r}$, for this audio content for the spatial zones $Z_1$ through $Z_m$ for the one or more types of visual content $t_1$ through $t_r$. In these embodiments, the audio parameters $p_{1,1}$ through $p_{m,r}$ can include, or be in terms of, sound intensity and/or time delay, among others for the audio content for the spatial zones $Z_1$ through $Z_m$ for the one or more types of visual content $t_1$ through $t_r$. For example, the audio parameters $p_{1,1}$ through $p_{m,r}$ can describe various sound intensities and/or time delays for the audio content for the spatial zones $Z_1$ through $Z_m$ for the one or more types of visual content $t_1$ through $t_r$. In some embodiments, the display device server 202 can store the audio parameters $p_{1,1}$ through $p_{m,r}$ for the spatial zones $Z_1$ through $Z_m$ for the one or more types of visual content $t_1$ through $t_r$ in the spatial position-based audio parameters 108 as described herein.

Generally, the display device server 202 can use the audio parameters $p_{1,1}$ through $p_{m,r}$ for the spatial zones $Z_1$ through $Z_m$ for the one or more types of visual content $t_1$ through $t_r$ to create a three-dimensional space to spatialize the audio content within the virtual model 300. The display device server 202 can identify the audio parameters $p_{1,1}$ through $p_{m,r}$ for the spatial zones $Z_1$ through $Z_m$ for the one or more types of visual content $t_1$ through $t_r$ to provide the spatialization the audio content for the spatial zones $Z_1$ through $Z_m$ in terms of distance, direction, orientation, and/or position, among others within the virtual model 300. For example, the audio parameters $p_{1,1}$ through $p_{m,r}$ for the spatial zones $Z_1$ through $Z_m$ for the one or more types of visual content $t_1$ through $t_r$ can include left stereo channels and/or right stereo channels to spatialize the audio content within the virtual model 300. In some embodiments, the audio parameters $p_{1,1}$ through $p_{m,r}$ for the spatial zones $Z_1$ through $Z_m$ for the one or more types of visual content $t_1$ through $t_r$ can be related to the one or more types of visual content $t_1$ through $t_r$ being played back by the virtual display device 302, the three-dimensional coordinates, for example, x, y, and z coordinates of a Cartesian coordinate system and/or r, θ, and φ coordinates of a spherical coordinate system, among others, of the virtual user devices 304.1 through 304.*m* within the virtual model 300, the three-dimensional coordinates, for example, x, y, and z coordinates of a Cartesian coordinate system and/or r, θ, and φ coordinates of a spherical coordinate system, among others, of the audio content being played back within the virtual model 300, and/or the three-dimensional orientations, often expressed in terms of yaw, pitch, and roll, of the virtual user devices 304.1 through 304.*m* within the virtual model 300. In these embodiments, the display device server 202 can determine the audio parameters $p_{1,1}$ through $p_{m,r}$ for the spatial zones $Z_1$ through $Z_m$ based upon the one or more types of visual content $t_1$ through $t_r$, the three-dimensional coordinates of the virtual user devices 304.1 through 304.*m*, the three-dimensional coordinates of the audio content being played back within the virtual model 300, and/or the three-dimensional orientations of the virtual user devices 304.1 through 304.*m* within the virtual model 300 to identify various sound intensities and/or time delays for the audio content for the spatial zones $Z_1$ through $Z_m$ for the one or more types of visual content $t_1$ through $t_r$. For example, for the two-dimensional anamorphic visual content, the display device server 202 can approximate these sound intensities, denoted $I_L$, and/or these time delays, denoted as ΔT, as follows:

$$I_L = \frac{P_s * G}{4 * \pi * D_L^2}, \Delta T = \frac{D_L}{C} \tag{1}$$

As another example, for the three-dimensional volumetric visual content, the display device server 202 can approximate these sound intensities, denoted $I_L$, and/or these time delays, denoted as ΔT, as follows:

$$I_L = \frac{P_s * G}{4 * \pi * D_L^2} * C_{absorption},\ \Delta T = \frac{D_L}{C_m} \tag{2}$$

As a further example, for the pass-through visual content, the display device server 202 can approximate these sound intensities, denoted $I_L$, and/or these time delays, denoted as ΔT, as follows:

$$I_L = \frac{P_s * G}{4 * \pi * D_L^2} * F,\ \Delta T = \frac{D_L}{C} \tag{3}$$

As a yet further example, for augmented reality visual content, the display device server 202 can approximate these sound intensities, denoted $I_L$, and/or these time delays, denoted as ΔT, as follows:

$$I_L = \frac{P_s * G}{4 * \pi * D_L^2} * (1 + C_{reflection} + C_{diffraction}),\ \Delta T = \frac{D_L}{C} \tag{4}$$

In these examples $I_L$ represents the intensity of the audio content at the three-dimensional coordinates of spatial distance L, c represents the speed of sound, $c_m$ represents the speed of sound in a medium m, G represents gain, $$D_L = \frac{\sin B}{\sin A} * a, \text{ where } A = \cos^{-1}\frac{\vec{b} \cdot \vec{c}}{b * c},$$

distance from the three-dimensional coordinates of the spatial distance L to the virtual display device 302, $P_S$ represents the power level of the audio content being played back by the virtual display device 302, $C_{reflection}$, $C_{diffraction}$, and $C_{absorption}$ represent reflection, diffraction, and absorption coefficients, respectively, F represents filter, and θ represents the three-dimensional orientation at the spatial distance L. In some embodiments, the three-dimensional orientation at the spatial distance L can be acquired the virtual user devices 304.1 through 304.*m* and be used for left/right panning calculation for further personalization, for example:

$$\text{Gain}_{left} = \cos\left(\frac{\theta}{2}\right) \text{ and } \text{Gain}_{right} = \sin\left(\frac{\theta}{2}\right) \tag{5}$$

Exemplary Types of Visual Content that can be Played Back by the Exemplary Real-World Environment FIG. 4A through 4D graphically illustrates one or more types of visual content that can be played back by the exemplary real-world environment according to some exemplary embodiments of the present disclosure. As described herein, the real-world environment 100 can playback audio-visual content having audio and visual content. In some embodiments, the one or more types of visual content that can be played back by the real-world environment 100 can include two-dimensional anamorphic visual content, three-dimensional volumetric visual content, pass-through visual content, and/or augmented reality visual content, among others, each of which is to be described herein.

Figure 4A:
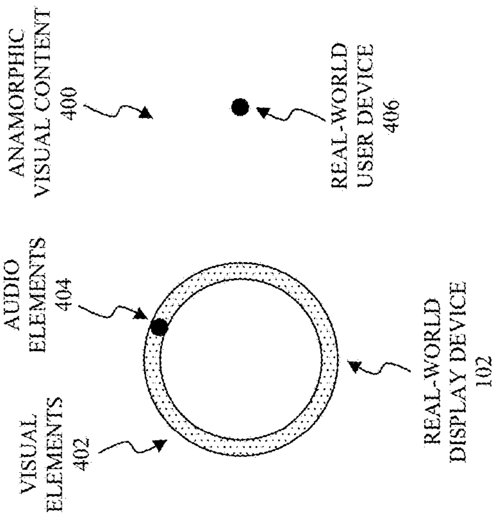
FIG. 4A through 4D graphically illustrates one or more types of visual content that can be played back by the exemplary real-world environment according to some exemplary embodiments of the present disclosure.

As illustrated in FIG. 4A, the real-world environment 100 can play back two-dimensional anamorphic visual content 400 on a physical surface of the real-world display device 102 to a real-world user device 406, for example, one or more of the real-world user devices 104.1 through 104.*n*. In some embodiments, the two-dimensional anamorphic visual content 400 can include visual content 402, shown using dotted shading, on the physical surface of the real-world display device 102 and audio content 404 that appear to be projecting from the physical surface of the real-world display device 102 when played back by the real-world user device 406.

Figure 4B:
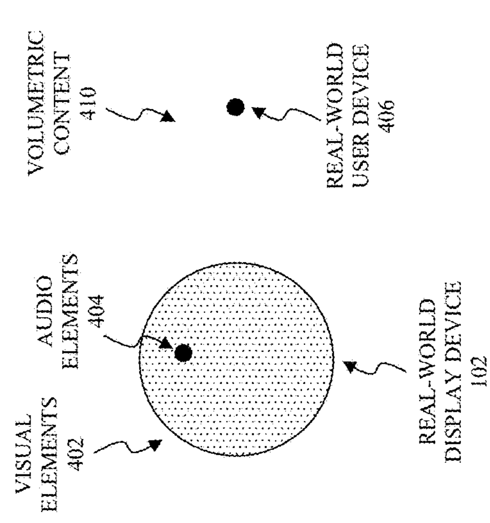

As illustrated in FIG. 4B, the real-world environment 100 can play back three-dimensional volumetric visual content 410 that appears within the physical surface of the real-world display device 102 to the real-world user device 406. In some embodiments, the three-dimensional volumetric visual content 410 can include the visual content 402, shown using dotted shading, within the physical surface of the real-world display device 102 and audio content 404 that appear to be projecting from within the physical surface of the real-world display device 102 when played back by the real-world user device 406.

Figure 4C:
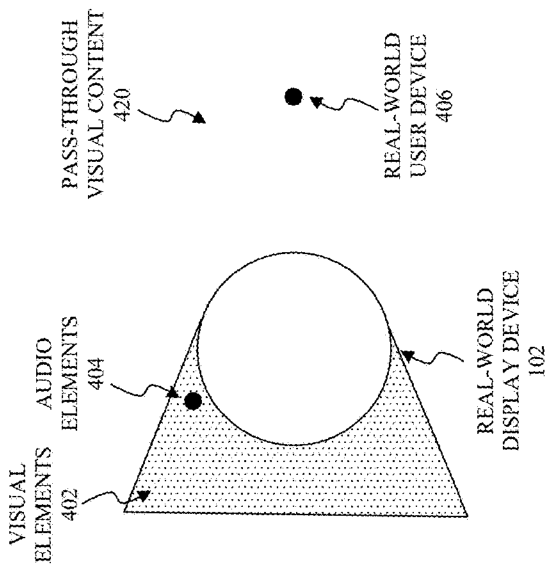

As illustrated in FIG. 4C, the real-world environment 100 can play back pass-through visual content 420 that appears to travel through the physical surface of the real-world display device 102 to the real-world user device 406. In some embodiments, the pass-through visual content 420 can include the visual content 402, shown using dotted shading, which travel through the real-world display device 102 and audio content 404 that appear to be projecting within the visual content 402 when played back by the real-world user device 406.

Figure 4D:
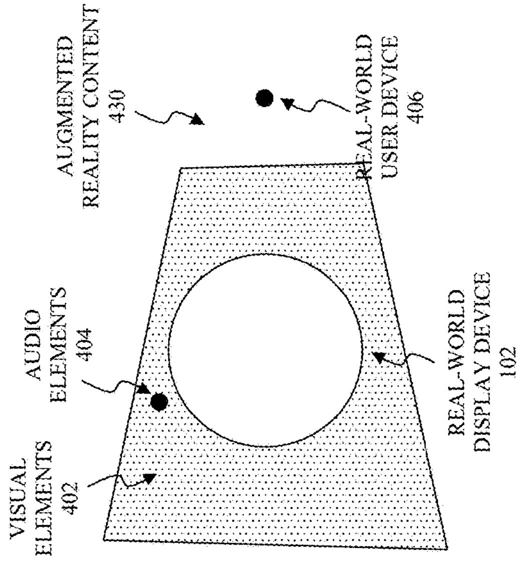

As illustrated in FIG. 4D, the real-world environment 100 can play back augmented reality content 430 that combines real-world three-dimensional visual content and computer generated three-dimensional visual content to the real-world user device 406. In some embodiments, the augmented reality content 430 can include the visual content 402, shown using dotted shading, which surround the real-world display device 102 and audio content 404 that appear to be projecting within the visual content 402 when played back by the real-world user device 406.

Exemplary Operational Control Flows for the Exemplary Real-World Environment

Figure 5:
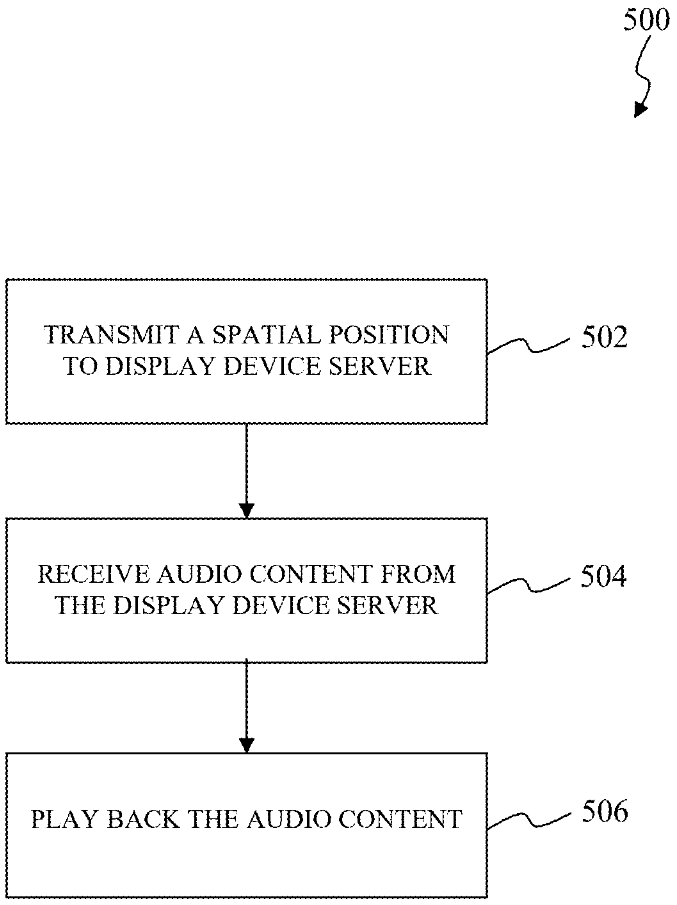
FIG. 5 illustrates an exemplary operational control flow for an exemplary real-world user device within the exemplary real-world environment in accordance with some exemplary embodiments of the present disclosure.

FIG. 5 illustrates an exemplary operational control flow for an exemplary real-world user device within the exemplary real-world environment in accordance with some exemplary embodiments of the present disclosure. The following discussion is to describe an exemplary operational control flow 500 for the exemplary the real-world user device to playback the audio content as described herein. The present disclosure is not limited to these exemplary operational control flows. Rather, it will be apparent to ordinary persons skilled in the relevant art(s) that other operational control flows are within the scope and spirit of the present disclosure. In some embodiments, the operational control flow 500 can be performed by a real-world user device, such as one or more of the real-world user devices 104.1 through 104.*n* as described herein. In these embodiments, the real-world user device can execute an application program, a software application, an application, or the like to playback the audio content as described herein.

In these embodiments, the application program, the software application, the application, or the like, when executed by real-world user device, can functionally cooperate with a real-world display device, such as the real-world display device to provide an example, to playback the audio content as described herein.

At operation 502, the operational control flow 500 transmits a spatial position of the real-world user device to the display device server. In some embodiments, the spatial position of the real-world user device can include the three-dimensional coordinates, for example, x, y, and z coordinates of a Cartesian coordinate system and/or r, θ, and φ coordinates of a spherical coordinate system, among others, of the real-world user device within the exemplary real-world environment as described herein. In some embodiments, the operational control flow 500 can estimate the three-dimensional coordinates of the real-world user device through Global Positioning System (GPS) signals, Wi-Fi signals, and/or cellular telephone signals, among others to provide some examples as will be recognized by those skilled in the relevant art(s) without departing from the spirit and scope of the present disclosure. Alternatively, or in addition to, the spatial position of the real-world user device can include the three-dimensional orientation, often expressed in terms of yaw, pitch, and roll, of the real-world user device within the exemplary real-world environment as described herein. In some embodiments, the operational control flow 500 can estimate the three-dimensional orientation of the real-world user device using an accelerometer, or a gyroscope, among others to provide some examples as will be recognized by those skilled in the relevant art(s) without departing from the spirit and scope of the present disclosure. In some embodiments, the operational control flow 500 can transmit the spatial position of the real-world user device to the display device server, for example, once every millisecond, once every ten milliseconds, once every one-hundred milliseconds, once every second, once every ten seconds, and/or once every one-hundred seconds, among others.

At operation 504, the operational control flow 500 can receive the audio content from the display device server for playback. In some embodiments, the operational control flow 500 can receive one or more digital audio content packets that include the audio content from the display device server that has been personalized to the spatial position from operation 502 in a substantially similar manner as described herein. In some embodiments, the one or more digital audio content packets can be streamed in real-time, or near real-time, by the display device server over, for example, the Internet. In these embodiments, the one or more digital audio content packets can be streamed in accordance with an audio streaming protocol, such as Hypertext Transfer Protocol (HTTP) Live Stream (HLS), Real-Time Streaming Protocol (RTSP), or Dynamic Adaptive Streaming over HTTP (ASH), among others to provide some examples.

At operation 506, the operational control flow 500 can playback the audio content from operation 504. In some embodiments, the operational control flow 500 can decompress the one or more digital audio content packets from operation 504 to recover the audio content from operation 504. In these embodiments, the operational control flow 500 can decompress the one or more digital audio content packets from operation 504 in accordance with an audio codec, such as Advanced Audio Coding (AAC), MP3, or Opus, among others to provide some examples. In some embodiments, the operational control flow 500 can playback this recovered audio content in real-time, or near real-time. Alternatively, or in addition to, the operational control flow 500 can provide this recovered audio content to a peripheral device, such as the peripheral device 106, for playback.

Figure 6:
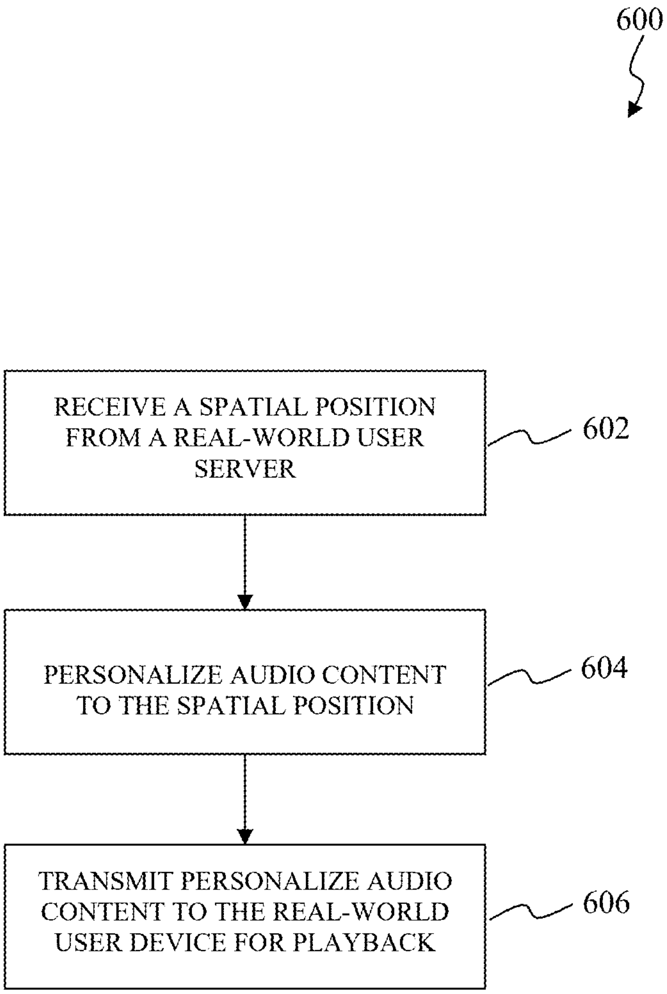
FIG. 6 illustrates an exemplary operational control flow for an exemplary display device server within the exemplary real-world environment in accordance with some exemplary embodiments of the present disclosure.

FIG. 6 illustrates an exemplary operational control flow for an exemplary display device server within the exemplary real-world environment in accordance with some exemplary embodiments of the present disclosure. The following discussion is to describe an exemplary operational control flow 600 for the exemplary the display device server to provide the audio content for playback as described herein. The present disclosure is not limited to these exemplary operational control flows. Rather, it will be apparent to ordinary persons skilled in the relevant art(s) that other operational control flows are within the scope and spirit of the present disclosure. In some embodiments, the operational control flow 600 can be performed by a real-world user device, such as the real-world user device as described herein.

At operation 602, the operational control flow 600 receives a spatial position of a real-world user device. In some embodiments, the spatial position of the real-world user device can include the three-dimensional coordinates, for example, x, y, and z coordinates of a Cartesian coordinate system and/or r, θ, and φ coordinates of a spherical coordinate system, among others, of the real-world user device within the exemplary real-world environment as described herein. Alternatively, or in addition to, the spatial position of the real-world user device can include the three-dimensional orientation, often expressed in terms of yaw, pitch, and roll, of the real-world user device within the exemplary real-world environment as described herein. In some embodiments, the operational control flow 600 can receives the spatial position of the real-world user device, for example, once every millisecond, once every ten milliseconds, once every one-hundred milliseconds, once every second, once every ten seconds, and/or once every one-hundred seconds, among others.

At operation 604, the operational control flow 600 personalizes the audio content to the spatial position from operation 602. In some embodiments, the operational control flow 600 can access an audio parameter, such as an audio parameter from among the audio parameters $p_{1,1}$ through $p_{m,r}$ to provide an example, for the type of visual content, such as one of the one or more types of visual content $t_1$ through $t_r$, that is associated with the spatial position from operation 602 in a substantially similar manner as described herein. In these embodiments, the operational control flow 600 can access spatial position-based audio parameters, such as the spatial position-based audio parameters 108, to identify the audio parameter in a substantially similar manner as described herein. In some embodiments, the operational control flow 600 can process the audio content in accordance with the audio parameter to personalize the audio content to the spatial position from operation 602. In these embodiments, the operational control flow 600 can process the audio content, for example, amplitudes and/or frequencies among others, of the audio content, to produce the audio content having the audio parameter at the spatial position from operation 602.

At operation 606, the operational control flow 600 transmits the personalized audio content from operation 604 to the real-world user device for playback. In some embodiments, the operational control flow 600 can compress the personalized audio content from operation 604 to provide one or more digital audio content packets. In these embodiments, the operational control flow 600 can compress the one or more digital audio content packets in accordance with an audio codec, such as Advanced Audio Coding (AAC), MP3, or Opus, among others to provide some examples. In some embodiments, the operational control flow 600 can stream the one or more digital audio content packets in real-time, or near real-time, by the display device server over, for example, the Internet. In these embodiments, the operational control flow 600 can stream the one or more digital audio content packets in accordance with an audio streaming protocol, such as Hypertext Transfer Protocol (HTTP) Live Stream (HLS), Real-Time Streaming Protocol (RTSP), or Dynamic Adaptive Streaming over HTTP (ASH), among others to provide some examples.

Figure 7:
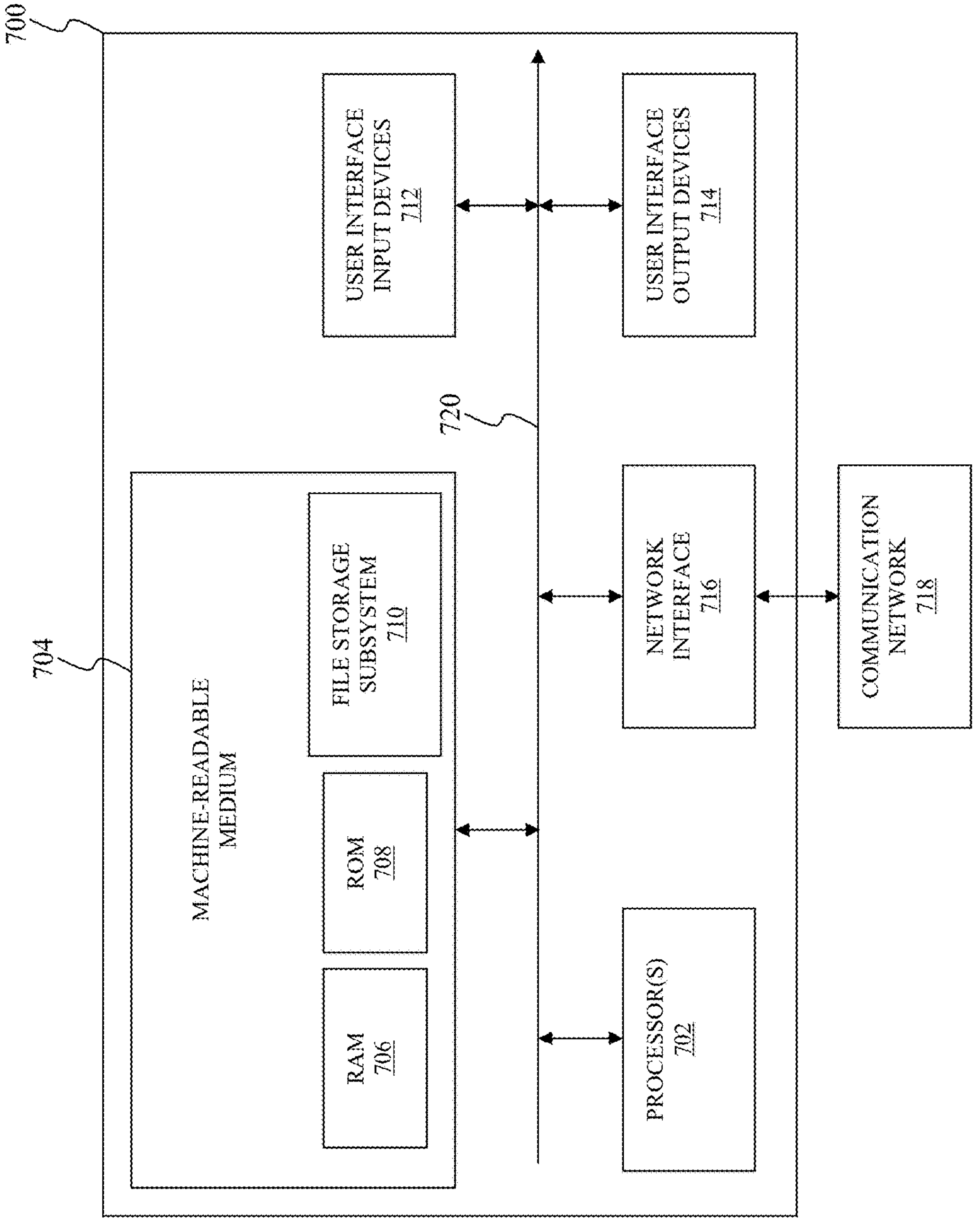
FIG. 7 illustrates a simplified block diagram of an exemplary computer system that can be implemented within the exemplary real-world environment according to some exemplary embodiments of the present disclosure.

Exemplary Computer System that can be Implemented within the Exemplary Real-World Environment FIG. 7 illustrates a simplified block diagram of an exemplary computer system that can be implemented within the exemplary real-world environment according to some exemplary embodiments of the present disclosure. The discussion of FIG. 7 to follow is to describe a computer system 700 that can be implemented within the real-world display device 102 and/or the display device server 202 as described herein.

In the exemplary embodiment illustrated in FIG. 7, the computer system 700 includes one or more processors 702. In some embodiments, the one or more processors 702 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical, or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors, or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).) In some embodiments, the computer system 700 can include an operating system, such as Microsoft's Windows, Sun Microsystems's Solaris, Apple Computer's MacOs, Linux or UNIX. In some embodiments, the computer system 700 can also include a Basic Input/Output System (BIOS) and processor firmware. The operating system, BIOS and firmware are used by the one or more processors 702 to control subsystems and interfaces coupled to the one or more processors 702. In some embodiments, the one or more processors 702 can include the Pentium and Itanium from Intel, the Opteron and Athlon from Advanced Micro Devices, and the ARM processor from ARM Holdings.

As illustrated in FIG. 7, the computer system 700 can include a machine-readable medium 704. In some embodiments, the machine-readable medium 704 can further include a main random-access memory ("RAM") 706, a read only memory ("ROM") 708, and/or a file storage subsystem 710. The RAM 706 can store instructions and data during program execution and the ROM 708 can store fixed instructions. The file storage subsystem 710 provides persistent storage for program and data files, and may include a hard disk drive, a floppy disk drive along with associated removable media, a CD-ROM drive, an optical drive, a flash memory, or a removable media cartridge.

The computer system 700 can further include user interface input devices 712 and user interface output devices 714. The user interface input devices 712 can include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices to provide some examples. The user interface input devices 712 can be connected by wire or wirelessly to the computer system 700. Generally, the user interface input devices 712 are intended to include all possible types of devices and ways to input information into the computer system 700. The user interface input devices 712 typically allow a user to identify objects, icons, text, and the like that appear on some types of user interface output devices, for example, a display subsystem. The user interface output devices 714 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. Generally, the user interface output devices 714 are intended to include all possible types of devices and ways to output information from the computer system 700.

The computer system 700 can further include a network interface 716 to provide an interface to outside networks, including an interface to a communication network 718, and is coupled via the communication network 718 to corresponding interface devices in other computer systems or machines. The communication network 718 may comprise many interconnected computer systems, machines, and communication links. These communication links may be wired links, optical links, wireless links, or any other devices for communication of information. The communication network 718 can be any suitable computer network, for example a wide area network such as the Internet, and/or a local area network such as Ethernet. The communication network 718 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

As illustrated in FIG. 7, the one or more processors 702, the machine-readable medium 704, the user interface input devices 712, the user interface output devices 714, and/or the network interface 716 can be communicatively coupled to one another using a bus subsystem 720. Although the bus subsystem 720 is shown schematically as a single bus, alternative embodiments of the bus subsystem may use multiple buses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to be limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method for delivering audio content to a real-world user device within a real-world environment, the method comprising:

receiving, by a display device server within the real-world environment, a spatial position of the real-world user device within the real-world environment;

identifying, by the display device server, a type of visual content from among a plurality of types of visual content being played back by a real-world display device within the real-world environment;

personalizing, by the display device server, the audio content to the spatial position for the type of visual content; and transmitting, by the display device server, the personalized audio content to the real-world user device for playback.

2. The method of claim 1, wherein the personalizing comprises:

identifying a spatial zone that includes the spatial position from among a plurality of spatial zones within the real-world environment; and accessing an audio parameter that is associated with the spatial zone and the type of visual content from among a plurality of audio parameters that are associated with a plurality of spatial positions and a plurality of types of visual content.

3. The method of claim 2, wherein the plurality of spatial zones comprises a plurality of concentric three-dimensional volumes surrounding the display device server within the real-world environment.

4. The method of claim 2, wherein the personalizing comprises processing the audio content to produce the audio content having the audio parameter at the spatial position.

5. The method of claim 2, further comprising:

developing a virtual model of the real-world environment in a virtual environment, the virtual model including a virtual display device that is associated with the real-world display device and a plurality of virtual user devices that are associated with a plurality of real-world user devices within the plurality of spatial zones; and simulating playback of a plurality of audio contents from the virtual display device to the plurality of virtual user devices to determine the plurality of audio parameters within the plurality of spatial positions for the plurality of types of visual content.

6. The method of claim 5, wherein the developing the virtual model comprises:

defining a three-dimensional geometry of a virtual space in the virtual environment;

identifying a set of real-world acoustical properties that is associated with the type of visual content from among a plurality of sets of real-world acoustical properties that are associated with the plurality of types of visual content; and assigning the set of real-world acoustical properties to three-dimensional surfaces of the virtual display device to model interactions of the plurality of audio contents with the display device server within the real-world environment.

7. The method of claim 1, further comprising playing back, by a real-world display device that is associated with the display device server, visual content that is associated with the audio content at the spatial position.

8. A display device server for delivering audio content to a real-world user device within a real-world environment, the display device server comprising:

a memory configured to store instructions; and a processor configured to execute the instructions, the instructions, when executed by the processor, configuring the processor to:

receive a spatial position of the real-world user device within the real-world environment, identify a type of visual content from among a plurality of types of visual content being played back by a real-world display device within the real-world environment, personalize the audio content to the spatial position for the type of visual content, and transmit the personalized audio content to the real-world user device for playback.

9. The display device server of claim 8, wherein the instructions, when executed by the processor, configure the processor to:

identify a spatial zone that includes the spatial position from among a plurality of spatial zones within the real-world environment; and access an audio parameter that is associated with the spatial zone and the type of visual content from among a plurality of audio parameters that are associated with a plurality of spatial positions and a plurality of types of visual content.

10. The display device server of claim 9, wherein the plurality of spatial zones comprises a plurality of concentric three-dimensional volumes surrounding the display device server within the real-world environment.

11. The display device server of claim 9, wherein the instructions, when executed by the processor, configure the processor to process the audio content to produce the audio content having the audio parameter at the spatial position.

12. The display device server of claim 9, wherein the instructions, when executed by the processor, further configure the processor to:

develop a virtual model of the real-world environment in a virtual environment, the virtual model including a virtual display device that is associated with the real-world display device and a plurality of virtual user devices that are associated with a plurality of real-world user devices within the plurality of spatial zones; and simulate playback of a plurality of audio contents from the virtual display device to the plurality of virtual user devices to determine the plurality of audio parameters within the plurality of spatial positions for the plurality of types of visual content.

13. The display device server of claim 12, wherein the instructions, when executed by the processor, configure the processor to:

define a three-dimensional geometry of a virtual space in the virtual environment;

identify a set of real-world acoustical properties that is associated with the type of visual content from among a plurality of sets of real-world acoustical properties that are associated with the plurality of types of visual content; and assign the set of real-world acoustical properties to three-dimensional surfaces of the virtual display device to model interactions of the plurality of audio contents with the display device server within the real-world environment.

14. The display device server of claim 8, wherein the instructions, when executed by the processor, further configure the processor to play back visual content that is associated with the audio content at the spatial position on a display device that is associated with the display device server.

15. A display device for delivering audio content to a real-world user device within a real-world environment, the display device comprising:

a visual display configured to play back visual content; and a display device server configured to:

receive a spatial position of the real-world user device within the real-world environment;

identify a type of visual content from among a plurality of types of visual content being played back by the real-world display device within the real-world environment;

personalize the audio content to the spatial position for the type of visual content; and transmit the personalized audio content that is associated with the visual content to the real-world user device for playback.

16. The display device of claim 15, wherein the display device server is configured to:

identify a spatial zone that includes the spatial position from among a plurality of spatial zones within the real-world environment; and access an audio parameter that is associated with the spatial zone and the type of visual content from among a plurality of audio parameters that are associated with a plurality of spatial positions and a plurality of types of visual content.

17. The display device of claim 16, wherein the plurality of spatial zones comprises a plurality of concentric three-dimensional volumes surrounding the display device server within the real-world environment.

18. The display device of claim 16, wherein the display device server is configured to process the audio content to produce the audio content having the audio parameter at the spatial position.

19. The display device of claim 16, wherein the display device server is further configured to:

develop a virtual model of the real-world environment in a virtual environment, the virtual model including a virtual display device that is associated with the real-world display device and a plurality of virtual user devices that are associated with a plurality of real-world user devices within the plurality of spatial zones; and simulate playback of a plurality of audio content from the virtual display device to the plurality of virtual user devices to determine the plurality of audio parameters within the plurality of spatial positions for the plurality of types of visual content.

20. The display device of claim 19, wherein the display device server is configured to:

define a three-dimensional geometry of a virtual space in the virtual environment;

identify a set of real-world acoustical properties that is associated with the type of visual content from among a plurality of sets of real-world acoustical properties that are associated with the plurality of types of visual content; and assign the set of real-world acoustical properties to three-dimensional surfaces of the virtual display device to model interactions of the plurality of audio content with the display device server within the real-world environment.

21. The method of claim 2, wherein the personalizing further comprises:

determining a value for the audio parameter based upon the spatial position and the type of visual content; and processing the audio content according to the value to personalize the audio content for playback at the spatial position for the type of visual content.

22. The method of claim 21, wherein determining the value for the audio parameter comprises selecting the value based on preference information associated with a user for playback of the type of visual content.

23. The display device server of claim 9, wherein the instructions, when executed by the processor, configure the processor to:

determine a value for the audio parameter based upon the spatial position and the type of visual content; and process the audio content according to the value to personalize the audio content for playback at the spatial position for the type of visual content.

24. The display device server of claim 23, wherein the instructions, when executed by the processor, configure the processor to select the value based on preference information associated with a user for playback of the type of visual content.

* * * * *